US009037406B2

(12) United States Patent
Mason et al.

(10) Patent No.: US 9,037,406 B2
(45) Date of Patent: May 19, 2015

(54) VEHICLE FLEET ROUTING SYSTEM

(71) Applicant: Telogis, Inc., Aliso Viejo, CA (US)

(72) Inventors: Ralph James Mason, Middleton (NZ); Ray Hidayat, Christchurch (NZ); Arthur Newth Morris, Laguna Beach, CA (US); Jeremy Beavon, Christchurch (NZ); Michael Russell, Christchurch (NZ); Mark Dunlop, Christchurch (NZ)

(73) Assignee: TELOGIS, INC., Aliso Viejo, CA (US)

( * ) Notice: Subject to any disclaimer, the term of this patent is extended or adjusted under 35 U.S.C. 154(b) by 0 days.

(21) Appl. No.: 13/648,243

(22) Filed: Oct. 9, 2012

(65) Prior Publication Data

US 2013/0096815 A1 Apr. 18, 2013

Related U.S. Application Data

(60) Provisional application No. 61/545,020, filed on Oct. 7, 2011.

(51) Int. Cl.
| | |
|---|---|
| *G06Q 10/00* | (2012.01) |
| *G01C 21/00* | (2006.01) |
| *G06Q 10/04* | (2012.01) |
| *G08G 1/123* | (2006.01) |
| *G08G 1/00* | (2006.01) |

(52) U.S. Cl.
CPC ............ *G01C 21/00* (2013.01); *G06Q 10/00* (2013.01); *G06Q 10/04* (2013.01); *G06Q 10/047* (2013.01); *G08G 1/123* (2013.01); *G08G 1/20* (2013.01)

(58) Field of Classification Search
CPC ...... G06Q 10/00; G06Q 10/04; G06Q 10/047
See application file for complete search history.

(56) References Cited

U.S. PATENT DOCUMENTS

| | | | |
|---|---|---|---|
| 5,880,958 A | 3/1999 | Helms et al. | |
| 6,675,150 B1 | 1/2004 | Camer | |
| 7,194,347 B2 * | 3/2007 | Harumoto et al. | 701/45 |
| 7,957,871 B1 | 6/2011 | Echeruo | |
| 7,974,774 B2 | 7/2011 | Kumar | |
| 8,103,532 B2 * | 1/2012 | Kenefic | 705/7.11 |
| 8,194,986 B2 | 6/2012 | Conwell | |
| 8,290,701 B2 | 10/2012 | Mason et al. | |
| 8,452,529 B2 * | 5/2013 | Alten | 701/400 |
| 2003/0018428 A1 | 1/2003 | Knockeart et al. | |

(Continued)

OTHER PUBLICATIONS

Kim, Byung-In, Seongbae Kim, and Surya Sahoo. "Waste collection vehicle routing problem with time windows." Computers & Operations Research 33.12 (2006): 3624-3642.*

(Continued)

*Primary Examiner* — Redhwan K Mawari
*Assistant Examiner* — Edward Torchinsky
(74) *Attorney, Agent, or Firm* — Knobbe, Martens, Olson & Bear LLP

(57) ABSTRACT

Vehicle management systems and associated processes can incorporate calculations for categorizing locations on a map as within one or more territories based on proximity of the location to predetermined points with in the territories. The systems and processes can also incorporate techniques for estimating total distance required to traverse a route reaching all of a set of predetermined stops, without using a routing algorithm that would provide a usable route for a vehicle, but is less computationally demanding. The systems and processes can also include techniques for incorporating legs of a route that extend through a temporary exclusion zone.

15 Claims, 7 Drawing Sheets

(56) References Cited

U.S. PATENT DOCUMENTS

| | | | |
|---|---|---|---|
| 2004/0088392 A1 | 5/2004 | Barrett et al. |
| 2005/0004757 A1 | 1/2005 | Neeman et al. |
| 2007/0179709 A1 | 8/2007 | Doyle |
| 2010/0287073 A1 | 11/2010 | Kocis et al. |
| 2013/0069803 A1 | 3/2013 | McCormick et al. |
| 2013/0339098 A1 | 12/2013 | Looman et al. |
| 2013/0339266 A1 | 12/2013 | Looman et al. |

OTHER PUBLICATIONS

International Search Report and Written Opinion issued in application No. PCT/US12/56423 on Apr. 4, 2013.

Raidl et al., "Greedy heuristics and an Evolutionary Algorithm for the Bounded-Diameter Minimum Spanning Tree Problem.", SAC, Melbourne, FL, pp. 747-752, 2003.

Malik et al., "Combinatorial Motion Planning of Multiple Vehicle Systems", Proceedings of the $45^{th}$ IEEE Conference on Decision and Control, Manchester Grand Hyatt Hotel, San Diego, CA, Dec. 13-15, 2006, pp. 5299-5304.

International Search Report and Written Opinion issued in application No. PCT/US2012/059404 on Jan. 17, 2013.

A Tutorial on Clustering Algorithms, Fuzzy C-Means Clustering, http://home.dei.polimi.it/matteucc/Clustering/tutorial_html/cmeans.html, 5 pages, accessed on May 8, 2012.

Ant Colony Optimization Algorithms, From Wikipedia, http://en.wikipedia.orq/wiki/Ant_colony_optimization_altorithms . . . , 13 pages, accessed on May 8, 2012.

The Stable Marriage Problem http://www.cs.vassar.edu/~cs241/teneyck/TheStableMarriageProblem.pdf, 2 pages, accessed on Apr. 29, 2013.

International Search Report and Written Opinion issued in application No. PCT/US2013/042924 mailed on Dec. 20, 2013.

International Search Report and Written Opinion issued in application No. PCT/US13/46016 mailed on Dec. 30, 2013.

* cited by examiner

VEHICLE FLEET ROUTING SYSTEM

RELATED APPLICATIONS

This application claims the benefit of priority under 35 U.S.C. §119(e) to U.S. Provisional Patent Application No. 61/545,020, filed on Oct. 7, 2011, entitled "VEHICLE FLEET ROUTING SYSTEM," which is hereby incorporated by reference in its entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

An aspect of at least one of the inventions disclosed herein includes the realization that routing systems for developing complete routes for a plurality of vehicles wherein the vehicles pre-associated with defined territories with fixed boundaries, can be further improved by configuring a routing system to consider routes without fixed boundaries, but with an alternative association between the vehicle and territory. For example, some known routing systems allow user to define a territory for each driver oriented vehicle by manually drawing fixed boundaries around a geographical location. The user can usually make these territories in any desired shape. Thus, the territories are often shaped depending upon user's client base and/or geographical features of the land on which those clients reside.

In some cases, the user can define fixed boundaries to define the territory centered at a driver's home. This might result in a gridlike arrangement of predefined territories. In other environments, a user might defined territories in a pie shaped, centered around a distribution center, for example.

Occasionally, a routing system might provide a result that provides good routing solutions for a particular territory defined by fixed boundaries, however, unbalanced when the routes provided for a plurality of territories are compared with each other. In such a situation, the user might manually change the boundaries of territories and recalculate routes so as to achieve a more balanced distribution of stops for each vehicle.

An aspect of at least one of the inventions disclosed herein includes the realization that other techniques can be used to define boundaries of a territory without using fixed boundaries. As used herein, and "fixed boundary" could be a street, a road, a geographical feature, a town, city, or county line, etc. In some embodiments, a territory could be defined by a radius around a predefined point. Additionally, territories could be overlapped such that the radius of two adjacent territories overlap geographically such that two vehicles could be routed to the same place.

Further, in some embodiments, a territory could be defined by a weighted characteristic such as a distance from a fixed point. For example, one territory might be defined as including any stop, but the cost of a nest of anyone. Is, or radius, from a predetermined fixed point. Thus, the farther away a stop is from the predetermined point, the more costly that stop is weighted when determining routes for a plurality of vehicles in a plurality of corresponding territories. Thus, in this environment of use, territories could be considered as being infinitely large. However, a routing algorithm would calculate the cost of a stop that is very far away from the associated fixed point of a territory as being too costly to include in a calculated route. Rather, that faraway stop would be included in a route for a vehicle that has its fixed point closer to the faraway stop.

In some embodiments, the weighted characteristic. Follow a nonlinear relationship such as a square cube relationship. Other nonlinear relationships can also be used, for example, but without limitation, log, etc.

When a plurality of adjacent territories are defined with such a technique, the territories could be considered as technically overlapping. However, the associated routing algorithm can compare routing solutions for vehicles adjacent territories and recalculate routes to balance loads or costs amongst the vehicles in a more balanced approach, without the need for user to manually reset territorial boundaries.

In some embodiments, an additional fixed boundary can be defined around the territory so as to prevent a routing algorithm from considering stops that can be eliminated from consideration as being too far away from the fixed point of the territory, thereby reducing the number of routing solutions to be considered.

Another aspect of the least one of the inventions disclosed herein includes the realization that it can be useful to add to a routing system the ability to estimate a characteristic of routes that might be generated for a given number of stops calculating a usable route for an optimal route. For example, in some known routing systems, the algorithms used to find an optimal or lowest-cost route between a given number of stops can be computationally demanding. Additionally, some routing systems might calculate a number of different usable routes that a vehicle could follow and compare them to determine which might be the optimal route. Again, this type of iterative routing computation can be very computationally demanding.

An aspect of at least one of the inventions disclosed herein includes the realization that a useful estimate your characterization of all of the likely routes that might be generated between a number of given stops can provide a routing system with a way to further optimizer adjusts the stops assigned to and adjacent territories or other requirements of prior to executing the more computationally demanding algorithms for determining a final usable route. For example, a routing system can be configured to estimate a total distance that would likely be traveled by vehicle using an optimized route between a plurality of stops, using a distance estimation technique, such as a spanning tree or minimum spanning tree technique, which would normally not provide a usable route that a vehicle could use to efficiently execute the predetermined stops. Such a technique, it has been found, can provide a roughly accurate prediction of the total distance the vehicle would drive in order to make the stops along an optimized route. Using this estimated total distance driven, a routing system can compare the estimated driving distance with estimated driving distances for other adjacent territories. Additionally, the estimated driving distance calculation can be reexecuted after adding or removing stops to provide alternative results, such as a more balanced result when considering routing vehicles and other adjacent territories.

After the predetermined stops have been adjusted or other characteristics of routing requirements have been changed, the routing system can then apply an appropriate routing technique for finding an operable route for vehicles to follow in order to make the final list of predetermined stops. Such techniques can include routing techniques known as the traveling salesman algorithm, or other algorithms.

Yet another aspect of the least one of the inventions disclosed herein includes the realization that they routing system can achieve improved results, that is lower-cost routing solutions for vehicle fleet, by further considering other options with regard to temporary exclusion zones. For example, in some locations, a local government might enforce temporary exclusion zones which can be in the form of an area of a city or town that is off-limits only during certain times of the day as well as streets that might be closed during certain times of the day or streets that might be one way during one part of the day and one way in the opposite direction in another part of the day.

Some known routing systems generate optimized routes and then, in the course of the calculation, if it is determined that the route would extend into an exclusion zone, the associated vehicle would be rerouted around the exclusion zone.

An aspect of at least one of the inventions disclosed herein includes the realization that they routing system can be configured to, when it generates a route that extends into an exclusion zone during a period of exclusion, consider other alternative routes that would allow a vehicle to pass through the exclusion zone, during a period when the exclusion is not enforced, for example, by rescheduling stops in the route.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Figure 1:
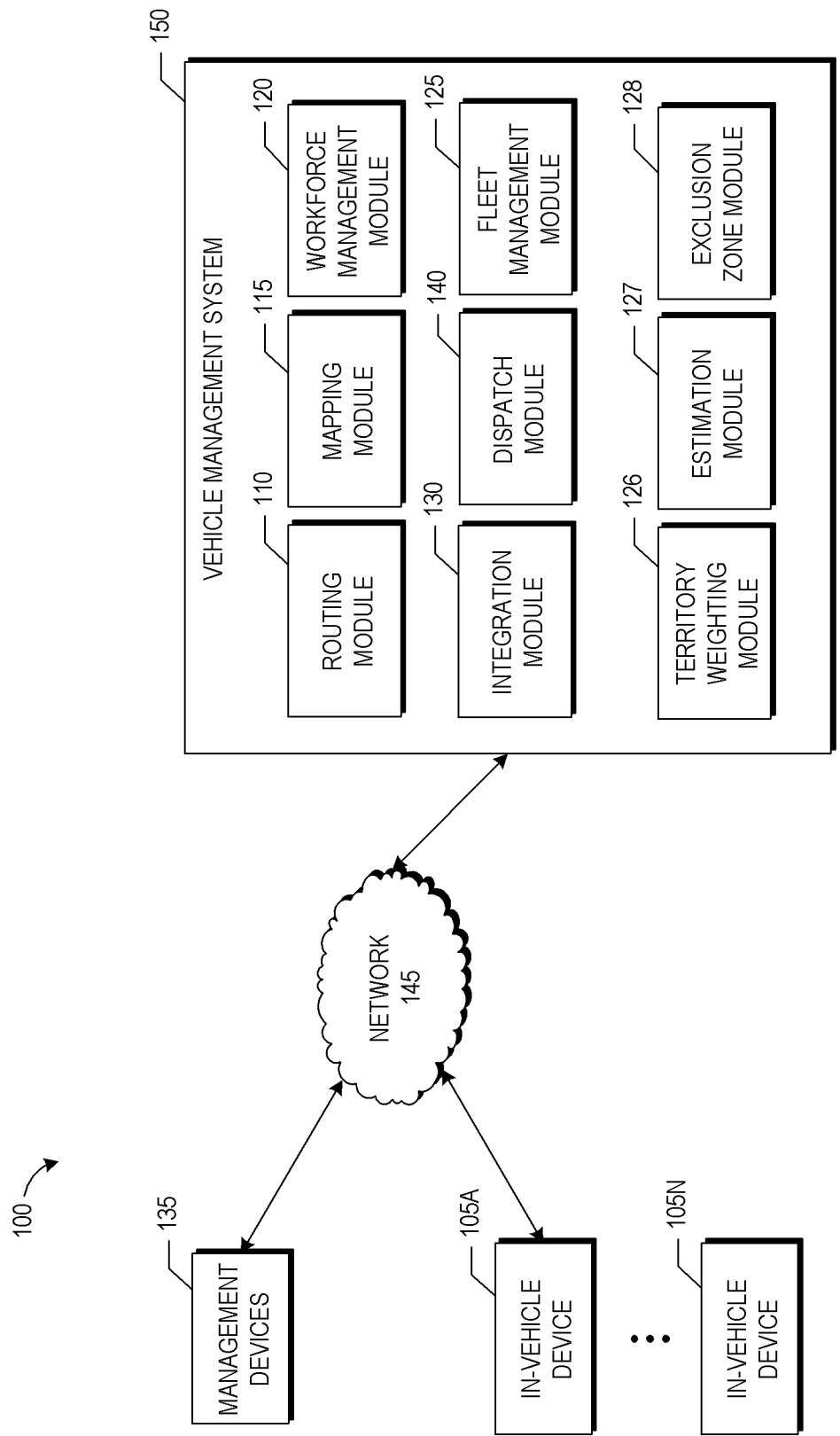
FIG. 1 illustrates an embodiment of a vehicle management system.

I. Introduction the embodiments disclosed herein are described in the context of a routing system that can include various features. For example, the routing system can include features associated with creating routes for vehicle fleets with adjacent territories, with a weighted system used to replace or supplement territories defined by fixed nonoverlapping territorial boundaries. Additionally, the systems can include distance estimation features for estimating a characteristic of optimized routes that could be generated for a pre-determined list of stops, without using a more computationally demanding routing algorithm. Further, the systems described below can also include features for providing more alternative and potentially lower-cost routing with regard to temporary exclusion zones.

Some of the systems described below incorporate Street classification techniques that can be used to assist in selecting routes for fleet vehicles and provide a way to limit the number of links that may be considered for determining a route. Traditional functional hierarchy classifications (e.g., NAVTEQ's road classification) are one size fits all classifications, not customized to different customer fleets, and can be used with some success for routing fleet vehicles. These traditional functional hierarchy classifications, however, may provide less flexibility, accuracy, and control than may be desirable. For example, a traditional functional hierarchy classification can rank roundabouts and ramps as minor streets. When such a classification ranking is used in routing, streets such as roundabouts and ramps can be excluded as potential streets for use in a route since the roundabouts and ramps may be considered too minor for inclusion, missing potentially important route options for certain fleets.

Advantageously, this disclosure describes embodiments where custom classifications are determined for streets of a network of streets. The custom classifications can be determined based at least in part on one or more custom routes satisfying one or more constraints that are calculated on the network of streets. A score indicative of a hierarchical ranking, degree of importance, or suitability for each street to routes of various lengths can be determined using the custom routes and stored as a custom classification for each street. In turn, the custom classifications can be used to efficiently calculate routes for hundreds or thousands of vehicles of a fleet of vehicles in a short time. The custom classifications can provide indications of custom uses or values of streets for routing particular fleets of vehicles.

The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

II. Vehicle Management System Overview

FIG. 1 illustrates an embodiment of a computing environment 100 for implementing an example vehicle management system 150. Among other features, the fleet management module 125, can include a territory weighting module 126, and estimation module 127, and an exclusion zone module 128.

The territory weighting module 126 can be configured to be used supplemental to or in substitution of fixed boundaries of a territory with regard to a routing algorithm. For example, the territory weighting module 126 can be configured to calculate a weighted territory value associated with each stop along a route. For example, the weighted territory value can be proportional to a distance of each stop relative to a fixed point within a predetermined territory. This additional weighted territory value can be used by the routing system to generate routes which are more optimal but might otherwise cause vehicles to cross territories that may have been defined by fixed boundaries.

The estimation module 127 can be configured to calculate an estimated characteristic any optimized route that might be generated for making a predetermined set of stops. This estimation can be useful for helping to compare the cost of servicing a set of stops with one vehicle with other routes based on a revision to the predetermined set of stops. Further, this estimation can be generated using a last computationally demanding algorithm than those used for creating usable routes that can be executed by vehicle and are optimized for example, for cost.

The exclusion zone module 128 can be configured to generate alternative routes that allow a vehicle to pass through an exclusion zone, such as a temporary exclusion zone, when the exclusion is not in force. Thus, the exclusion zone module 128 can provide an additional benefit in allowing vehicles to pass through a zone which may be blocked temporarily during the day, and to benefit from the, for example, shorter total distance afforded by traveling through such an exclusion zone. These and other features of the computing environment 100 are described below in greater detail, following a description of certain other portions of the computing environment 100.

In the computing environment 100, one or more in-vehicle devices 105A . . . 105N and management devices 135 communicate with the vehicle management system 150 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, vehicle sensor data, vehicle status (e.g., maintenance, tire pressure, or the like), and so forth. Example user interfaces for in-vehicle devices 105 are described further below with respect to FIG. 4.

The management devices 135 can be computing devices used by dispatchers, fleet managers, administrators, or other users to manage different aspects of the vehicle management system 150. For example, a user of a management device 135 can access the vehicle management system 150 to generate routes, dispatch vehicles and drivers, and perform other individual vehicle or fleet management functions. With the management devices 135, users can access and monitor vehicle information obtained from one or more of the in-vehicle devices 105 by the vehicle management system 150. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like. Example user interfaces for management devices 135 are described below in detail with respect to FIG. 4.

The vehicle management system 150 can be implemented by one or more physical computing devices, such as servers. These servers can be physically co-located or can be geographically separate, for example, in different data centers. In one embodiment, the vehicle management system 150 is implemented as a cloud computing application. For instance, the vehicle management system 150 can be a cloud-implemented platform hosted in one or more virtual servers and/or physical servers accessible to users over the Internet or other network 145. In the depicted embodiment, the vehicle management system 150 includes a routing module 110, a mapping module 115, a workforce management module 120, an integration module 130, a dispatch module 140, and a fleet management module 125. These components can, but need not, be integrated together on a common software or hardware platform.

The fleet management module 125 can include functionality for generating, rendering, or otherwise displaying a vehicle management user interface. The vehicle management user interface can include a map or list of vehicles that depicts symbols or other data representative of vehicles.

As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 125 can communicate with the mapping module 115 to obtain mapping data, which the fleet management module 125 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 125 can also access vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 110 can implement any of the routing features described above. In addition, the routing module 110 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 110 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety. In addition, the routing module 110 can perform the street classification and routing processes discussed below in detail with respect to FIG. 3.

The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. Other possible implementations of the vehicle management system 150 can include many more or fewer components than those shown in FIG. 1.

III. Routing Module Embodiments

Figure 2:
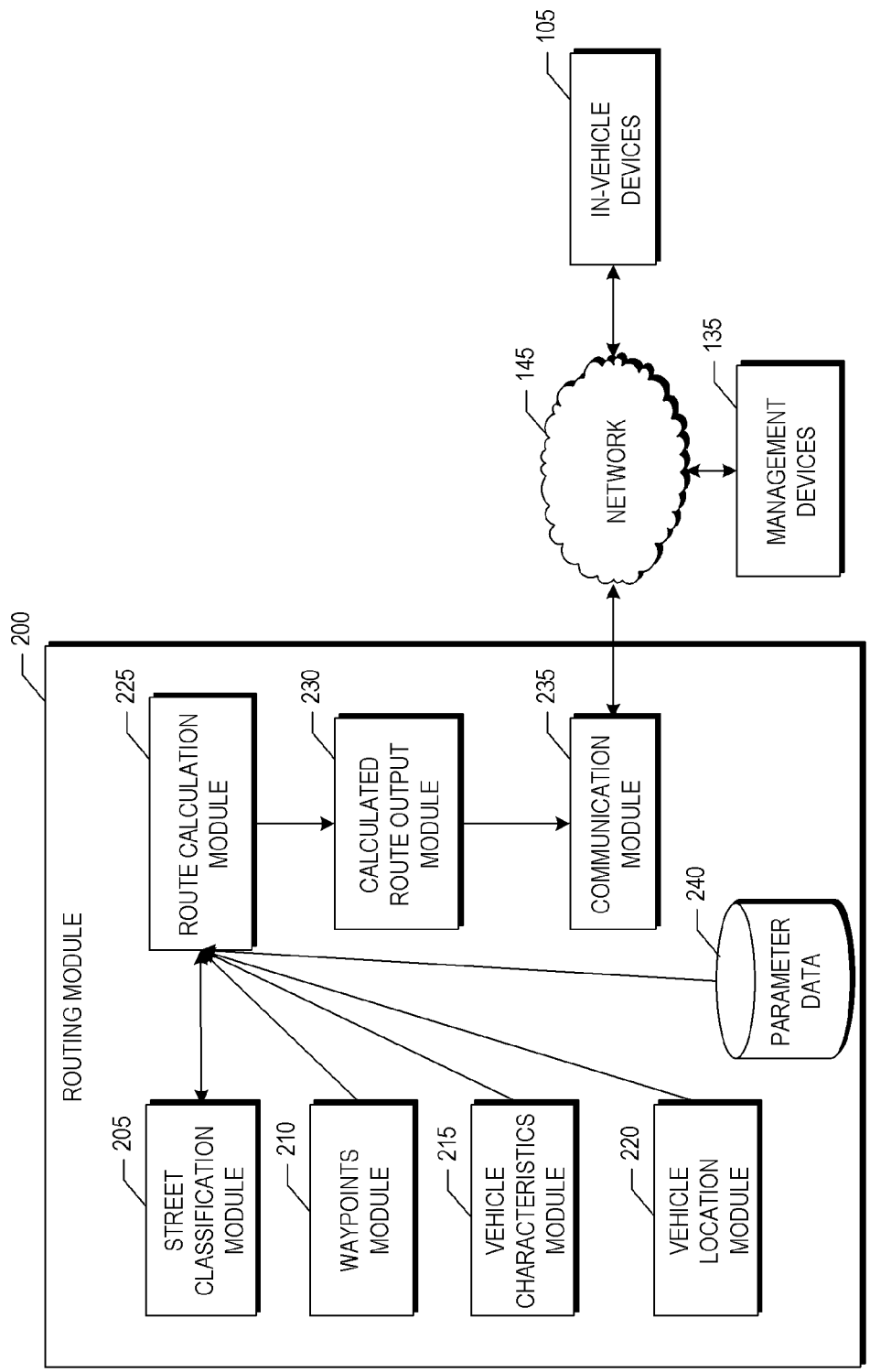
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can classify streets of a network of streets in a geographic region and use the street classifications to efficiently calculate routes for fleet vehicles on the network of streets. The management devices 135 and in-vehicle devices 105 of FIG. 1 are also shown communicating with the routing module 200 over the network 145.

In the depicted embodiment, the routing module 200 includes a street classification module 205, waypoints module 210, a vehicle characteristics module 215, a vehicle location module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like. Additionally, the routing module 200 can include information regarding exclusion zones, such as temporary exclusion zones. Such exclusion zones might be areas of a city, town, county, satte, or other jurisdiction that are closed to traffic during only particular times of day. For example, one exclusion zone might prohibit any vehicle traffic whatsoever between the hours of 9 AM and 10 AM.

The waypoints module 210 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 210 from the mapping module 115 described above. Additionally, the waypoints module 210 can include boundaries for territories. For example, the waypoints module 210 can provide for a user interface in the management device 135 that allows the user to input predetermined, fixed boundaries to territories for respective vehicles in a vehicle fleet. Additionally, the waypoints module 210 can allow user to change the fixed boundaries of territories. In some embodiments, a user might choose to create fixed territory boundaries that do not overlap. However, the waypoints module 210 can also be configured to allow user to define territories so as to overlap.

The vehicle characteristics module 215 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 220 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 210, the vehicle characteristics module 215, the vehicle location module 220, and/or the parameter database 240. In some embodiments, the route calculation module 225 determines custom routes between waypoint locations based on custom data. The custom routes can, in turn, be used by the street classification module 205 to classify streets of the custom routes for use in efficiently determining how to route fleet vehicles.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The street classification module 205 can determine street classifications at least in part based on custom routes calculated by the route calculation module 225. The street classification module 205 can receive custom routes calculated by the route calculation module 225 and analyze the custom routes to determine custom classifications, such as a score indicative of a hierarchical ranking, degree of importance, or suitability of streets for routing fleet vehicles. In some embodiments, the classification can be further based on spatial or topological relationships to other streets for routing, in addition to the class of the streets based on a street's federal or state highway status and the like, number of lanes, or other attributes of streets. The street classification module 205 can store the classifications in the parameter database 240 or outside the routing module 200 via storage connected to the network 145.

In addition, the route calculation module 225 can access and receive street classifications from the street classification module 205, the parameter database 240, or other storage connected to the network 145. The accessed and received street classifications can depend on a characteristic of a routing request (e.g., the fleet vehicle type to be routed, service level selected by the requestor, customer identification code, etc.) for a particular fleet of vehicles.

The route calculation module 225 can further use the street classifications to limit streets of the network that are considered for routing fleet vehicles. For instance, streets having a higher classification score indicative of a higher hierarchical ranking can be considered for longer distances or routes. On the other hand, streets having a classification score indicative of a lower hierarchical ranking can be considered for short distances or routes. In other embodiments, the route calculation module 225 can instead use the street classifications to weight the consideration of streets, determine degree of importance of streets, or predict function or uses of streets, among other possibilities.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving route modification based on traffic or weather conditions. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences. Further, in certain embodiments, the voice used to express the verbal directions can be changed without changing the language of the verbal directions.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200, such as the street classification module 205. In some embodiments, the parameter database 240 can be communicatively coupled to the network 145. As one example, the parameter database 240 can include look-up tables of information related to street classification data sets comprising street classifications. The look-up information can take characteristics of routing requests as inputs and enable look-ups of corresponding street classification data for use in routing calculations, for example. As another example, the parameter database 240 can store custom data as discussed in this disclosure for use in classifying streets.

In other embodiments, the parameter database(s) 240 or other data repositories can reside on the client computing device 135, at the dispatch center 140, within a vehicle 105, or at other remote locations communicatively coupled to the network 145.

IV. Overall Routing System Process

Figure 3:
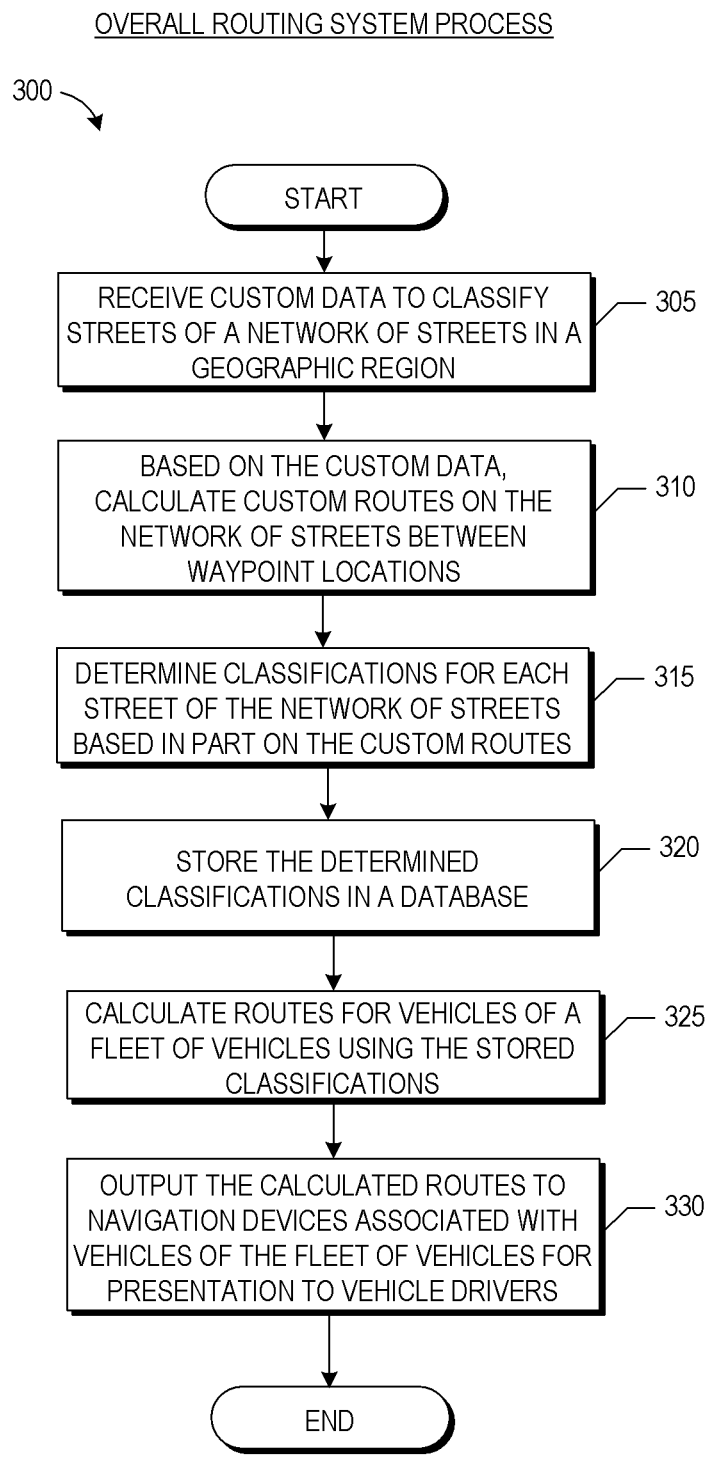
FIG. 3 illustrates an embodiment of an overall routing system process executable by the routing module of FIG. 2.

With reference to FIG. 3, an optional overall routing system process 300 executable by the routing module 200 is illustrated, although other processes can also be used. In certain embodiments, the routing module 200 can determine a score indicative of a hierarchical ranking of streets in a network of streets in a region by calculating custom routes on network of streets. In some embodiments, the routing module 200 can exclude streets of network of streets from consideration for a route or portion of route based on the score or hierarchical ranking. As a result of trimming down the search space, the routing module 200 can perform faster calculation of routes and enable more direct and efficient determination of routes than using some other methods.

At block 305, the route calculation module 225 receives custom data to classify streets of a network of streets in a geographic region. The custom data can include navigation or routing data used to influence the classification of streets. The custom data can, for example, include physical or legal restrictions relating to vehicles types, street travel limits, route stop requirements, geography like hills and bridges, weight capacities of roads, weather imposed road limitations, traffic effects, and restrictions on transportation of dangerous substances, among other possibilities. Moreover, the custom data can include an indication of a type of fleet vehicle to be routed, such as an automobile, semi-trailer, or hazardous waste truck. In addition, the custom data can include an indication of a route optimization approach, such as time optimization, fuel optimization, or distance optimization. Further, the custom data can include an indication of route conditions to avoid, such as tolls, ferries, borders, or the like. In certain embodiments, the custom data is customized to different customers or users of the vehicle management system 150.

The custom data can be received from the parameter database 240 or over the network 145 from different devices, such as management devices 135 or in-vehicle devices 105. For example, the route calculation module 225 can receive from in-vehicle devices 105 an indication of the type of vehicle in which the in-vehicle devices 105 are installed and use the indication as part of the received custom data. In certain embodiments, the custom data can be initially provided by a manager of the routing module 200 or a route calculation request, and the custom data can then be supplemented or updated by the initial source or other providers of custom data.

At block 310, based on the custom data, custom routes are calculated on the network of streets between waypoint locations by the route calculation module 225. The route calculation module 225 can generate custom routes using one or more initial criteria, variables, or factors indicated by the custom data. In some embodiments, the custom data is used to influence the calculation of custom routes between sets of two waypoint locations on the network of streets. The custom routes can be generated using a route optimization approach indicated in the custom data. In some embodiments, the route calculation module 225 can utilize some custom data and disregard other custom data, and thereby increase the processing speed for determining the custom routes. Moreover, in certain embodiments, the custom routes are calculated for street classification purposes and not for navigation purposes.

At block 315, classifications for each street of the network of streets are determined based at least in part on the custom routes, for example, by the street classification module 205. The classifications for each street can include an assigned score indicative of a hierarchical ranking of streets of the custom routes for calculating routes of different lengths for fleet vehicles. Various approaches can be utilized to determine the classifications, for example, including determining distances between streets and waypoint locations of custom routes or a frequency of occurrences of streets in custom routes. In some embodiments, the classifications are determined for some streets of the network but not others. Such an approach can facilitate parallel processing in classifying streets or permit an update of classifications for only a portion of the network.

At block 320, the determined classifications are stored by the street classification module 205 in a database, such as the parameter database 240. The classifications can be stored using a look-up table or other storage approach to facilitate access of the classification data for use in calculating routes.

At block 325, the route calculation module 225 calculates routes for vehicles of a fleet of vehicles using the stored classifications. The route classification module 225 can initially access the classifications stored in the parameter database 240 and associate the classifications with the streets of the network. Further, the route classification module 225 can access the waypoints module 210 for waypoint data, including starting locations, target or destination locations, intermediate waypoint locations, landmarks, and the like for the routes. The vehicle characteristics module 215 can provide vehicle characteristics regarding vehicles in the fleet, and the vehicle location module 220 can determine location information for each vehicle in the fleet.

The route calculation module 225 can then generate feasible, or candidate, routes based one or more initial criteria, variables, or factors. For example, the feasible routes can be generated based on shortest distance or estimated transit time. Feasible routes can also include routes having a characteristic within a predefined percentage of the "best" route, such as a route having a time or distance within about 1%, within about 5%, or within about 10% of the calculated best route.

In some embodiments, the calculation of routes is performed using one or more other initial search algorithms to provide an initial reduction of the total number of possible routes to further trim down the search space. For example, the initial reduction can narrow down the possible routes to exclude highly improbable routes. The initial search algorithms can include, for example, Djikstra's algorithm, Munkres (Hungarian) algorithm, breadth-first algorithms, depth-first algorithms, best-first algorithms, and/or the like. In some embodiments, heuristic search techniques (such as A* search or other such techniques) can be implemented to narrow down the time and complexity of the search for routes.

At block 330, the calculated route output module 230 outputs calculated routes to navigation devices associated with vehicles of the fleet of vehicles for presentation to vehicle driver. The navigation devices for instance can include an in-vehicle device 105 or handheld mobile device of a driver, for instance. Other methods can also be used.

V. Optional Street Classification Processes

The computing environment 100 can include a street classification module, such as the street classification related system components and methods disclosed in US patent application number, the entire contents of which is hereby incorporated by reference.

Figure 4:
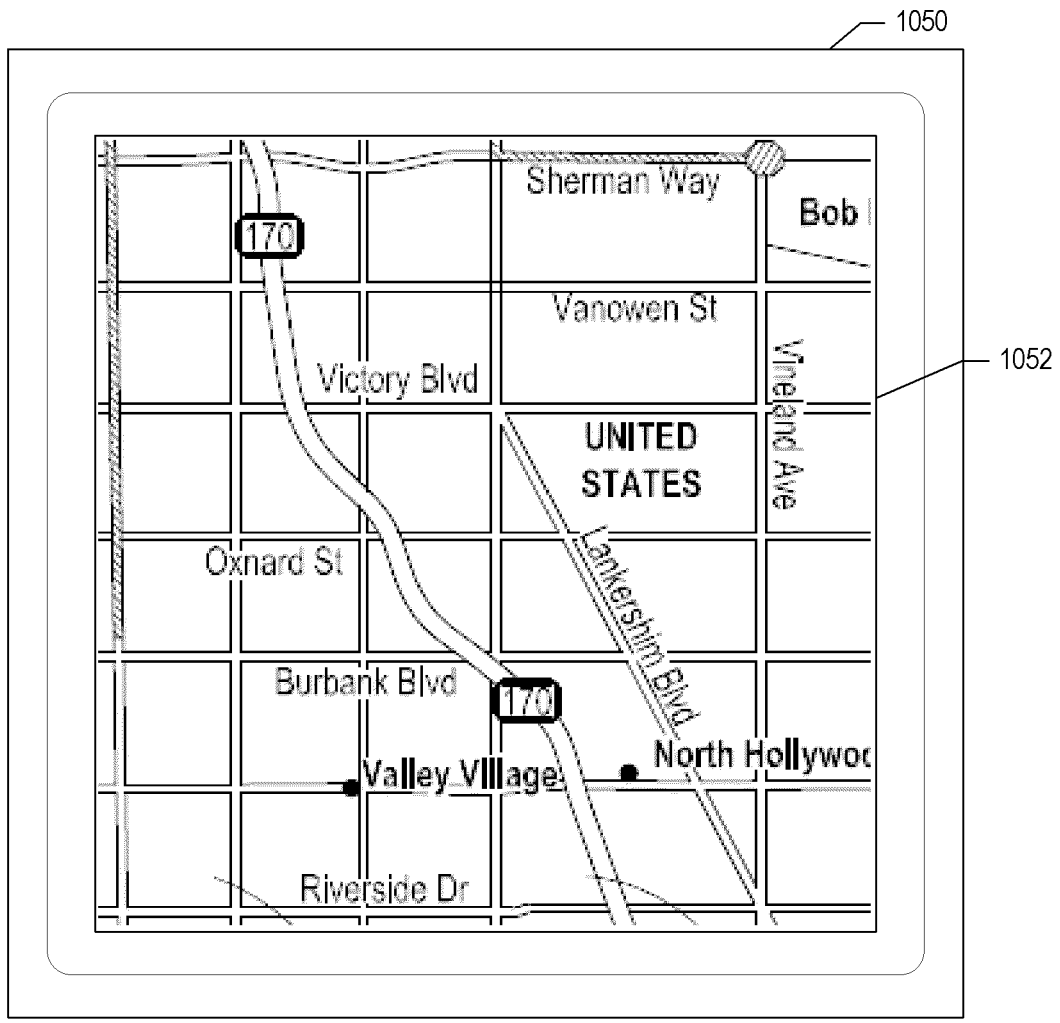
FIG. 4 illustrates an embodiment of a user interface display for outputting routes calculated using custom street classifications.

Turning to FIG. 4, an embodiment of a user interface 1050 for outputting routes calculated using street classifications by with custom data is illustrated. The user interface 1050 can be part of one or more navigation devices associated with the plurality of vehicles, such as management devices 135 or in-vehicle devices 105. The map display 1052 of the user interface 1050 can present a street map with visual aids or directions that update in real time as the driver travels, thereby showing the driver's progress. The map display 1052 can display one or more routes, which may include one or more intermediate stops. The visual aids can include arrows or similar colored lines overlaid over a street map.

The user interface 1050 can include, but is not limited to, an LCD display, a heads-up display, an LED display, a 2D display, and/or a 3D display to instruct a user of the system which way to travel. In some embodiments, images displayed on the map display 1052 simulate motion, such as a vehicle traveling down a city street. In some embodiments, the screen is interactive. For example, in some embodiments the user can input his current and destination locations, can update costs for given streets or routes, or can change his destination en route.

In some embodiments, the routing module 200 and the user interface 1050 are integrated into a vehicle navigation system or similar system. For example, in some embodiments, the visual outputs of the calculated route output module 230 are output via the vehicle's in-dash video display, and/or the audio outputs of the calculated route output module 230 are output via the car's audio speakers. In other embodiments, the user interface 1050 is integrated within a mobile handheld device in communication with the network 145. In some embodiments, a vehicle or similar device is controlled directly by the routing module 200.

VI. Gravity Points

As noted above, the vehicle management system 150 can include a territory weighting module 126, included in the fleet management module 125, or another one of the modules illustrated in FIG. 1. Other configurations can also be used.

Some of the potential benefits of using a territory weighting module 126, can be illustrated in light of the understanding that in some traditional routing systems, users can assign drivers fixed borders, within which the routing program will generate routes for those drivers. The processing of assigning or changing the fixed borders can be tedious and time-intensive. In addition, such borders can increase the complexity of a routing optimization problem.

The vehicle management system 150 can instead provide functionality for users to define a predetermined point within a drivers territory, which can also be considered a gravity point for drivers. In some embodiments, each driver can be assigned a gravity point. The gravity point can represent a point of maximum gravity, and the driver's territory can extend around the gravity point. Additionally, such territories can overlap, thereby allowing the vehicle management system 152 consider routes for one vehicle that might extend into an area that is also within the territory of another vehicle.

In some embodiments, the calculation associated with such a territory and functions such that as the straight line distance from the gravity point to a second point increases, the gravity at the second point can decrease. For example, the gravity can decrease exponentially or linearly, or based on some other relationship.

In some embodiments, the gravity point therefore defines a center of a cost field akin to a gravitational field surrounding a mass of matter. The routing algorithm used by the routing module can take this gravity field into account as part of an optimization problem to determine whether to assign a driver to a stop (or vice versa).

Thus, for example, if a stop is between the gravity points for two drivers, in one embodiment the routing algorithm picks the closest driver's gravity point and assigns the stop to that driver. In another embodiment, the closeness of a stop to a gravity point is merely one constraint of a plurality of constraints evaluated by an optimization problem of the routing module.

Advantageously, in certain embodiments, the gravity points approach to defining driver territories can take much less time for users to set up than the fixed borders approach. However, the gravity points approach can also take additional processing time for the optimization algorithm to process when assigning routes. Given this reduced computing efficiency, using gravity points is a counterintuitive approach to improving an optimization algorithm. In some embodiments, the vehicle management system 150 can be configured to allow a user to also input a maximum outer boundary of a territory for each vehicle.

Figure 5:
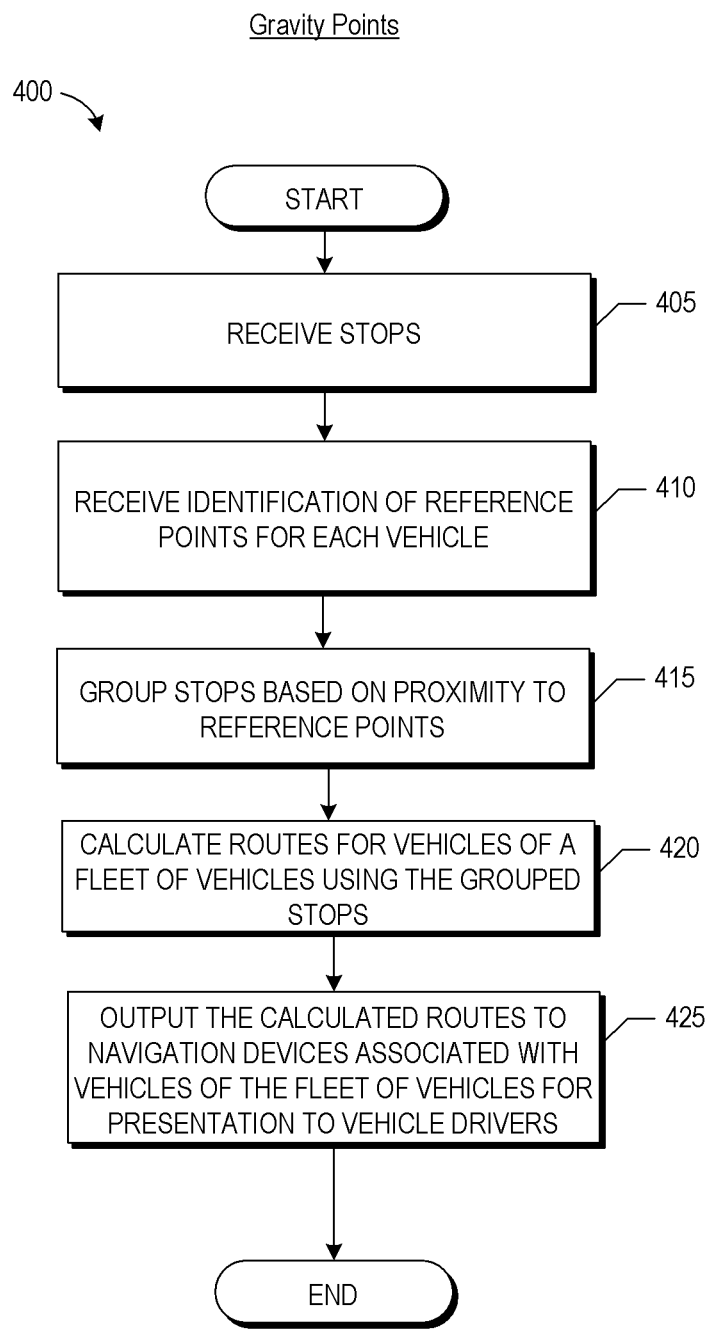
FIG. 5 illustrates an embodiment of a territory weighting process executable by a territory weighting module.

With reference to FIG. 5, an embodiment of a gravity point routing process 400 executable by the routing module 200 is illustrated. In some embodiments, the routing module 200 can operate in conjunction with the territory weighting module 126 to provide a user with an optional technique for automatically grouping stops with vehicles.

With reference to FIG. 5, at operation block 405, the routing module 200 can receive stops from the user. For example, the waypoints module 210 can receive a list of stops for a plurality of vehicles in a fleet.

At operation block 410, the routing module 200 can receive the identification of reference points for each vehicle. As noted above, these reference points can be considered "gravity points" and be predetermined by the user as a point within a territory for a particular vehicle or driver. The gravity point could be at the center of what the user intends to be as the territory for the driver or vehicle. Other points can also be used.

At operation block 415, the routing module 200 can group all the stops received in operation block 405 according to the proximity of the points identified in operation block 415. For example, each point can be assigned a value, such as the cost value, based on its distance from the reference point. These calculations can be repeated until all the stops have been grouped so as to provide one group of stops for each vehicle and such that the costs associated with the groupings are also about the same. This can help provide work load balancing for each of the vehicles in the fleet.

In some embodiments, this calculation can be based on a linear proportion of the distance from the reference point to each stop, exponential relationships, log relationships, etc. In some embodiments, the reference value associated with each stop is a proportional cube relationship, like a gravitational field.

Further, in some embodiments, in operation block 415, the groups can also be initially defined by a maximum radius, predetermined by the user, and input into the routing module 200. Thus, in an initial grouping of stops for each vehicle, stops falling outside the maximum radius can be excluded. As noted above, the stops can be regrouped until the reference calculations provide for the desired workload balancing for each group of stops.

In operation block 420, the routing module 200 can calculate optimized routes for each of the vehicles and the associated group of stops determines an operation block 415.

At operation block 425, the routes can be output to the navigation devices associated with each of the respective vehicles.

In some embodiments, the user interface of the routing module 200 can allow a user to input reference points for each territory or move such reference points as desired.

Figure 6:
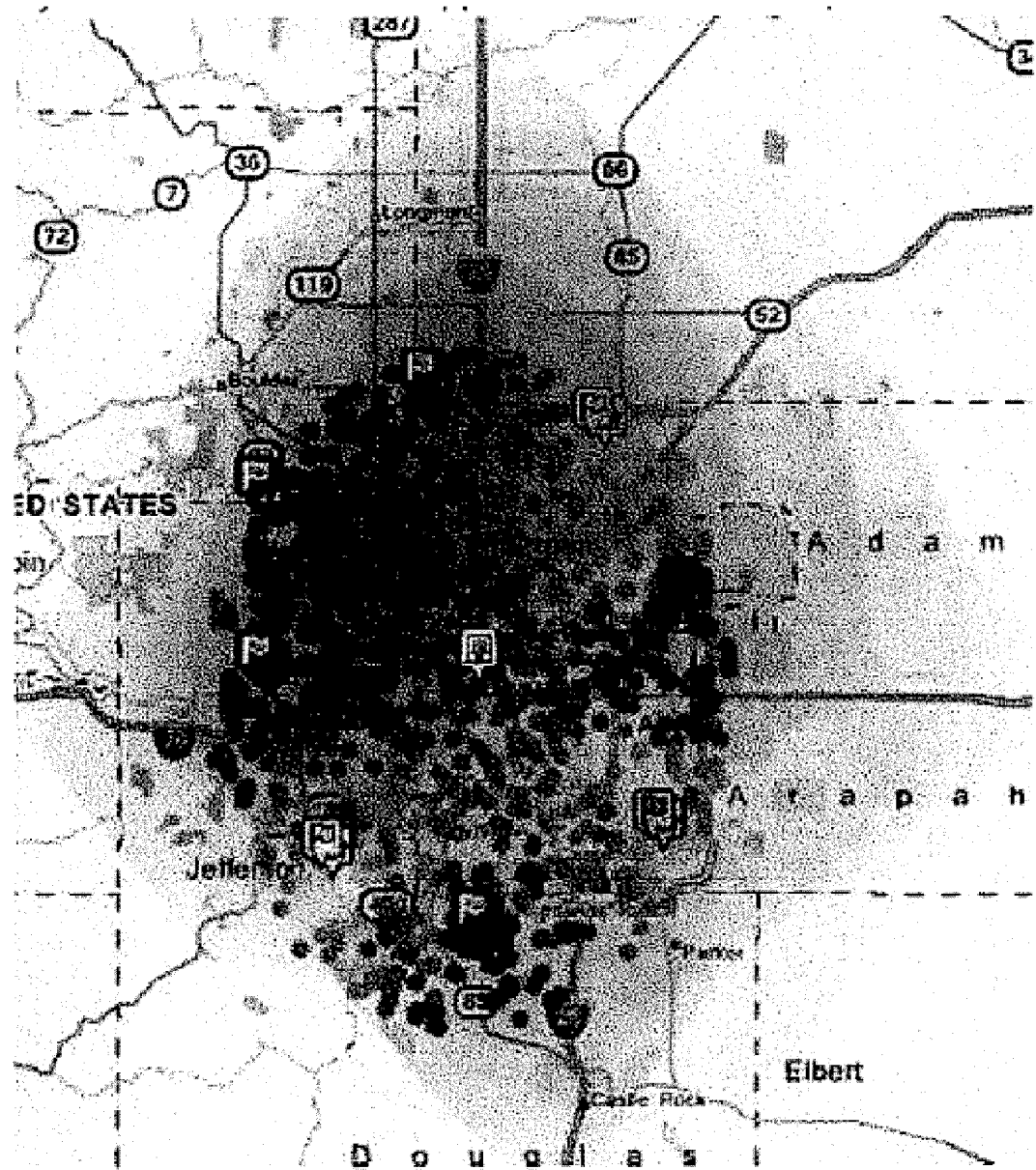
FIG. 6 illustrates a further embodiment of a user interface display for outputting representations of locations based on their presence in one or more adjacent territories.

Optionally, a user interface which may be included in the management device 135 (FIG. 1) can be configured to provide a graphical representation of stops and related territories. For example, as shown in FIG. 6, the dots on the illustrated map correspond to stops and are color-coded based on the proximity to the territories of different vehicles are drivers. Thus, certain stops are displayed in a color associated with a particular vehicle. However, stops that are about equidistant between the reference points for two territories are represented as a blend of the two different colors associated with those two different territories. Thus, a user can graphically see how the territory weighting module 126 has calculated or determined groups of stops.

In some embodiments, a territory is created for a driver and centered at a reference point input by a user. You may notice that the shape of territories is not round. This is because the likelihood that a driver will be assigned to stop at a customer is based on the time it takes to drive from the center of that driver's territory, not the distance from that center. Moreover, a territory can be drawn on the map as a shadow in a driver's color. The longer it takes to drive from the center of the territory, the paler the shadow, until the shadow fades out altogether.

VII. Distance Estimation

In some embodiments, the routing module 200 can be configured to perform a distance estimation algorithm to determine the likely travel time on a route prior to running a more computationally-costly routing algorithm. Thus, instead of solving the traveling salesman problem to calculate routes, the routing module can use a heuristic to estimate the cost of a route. This cost can be represented as time, money, distance, or a combination of the same. Performing the distance estimation can enable a customer or user of the vehicle management system to see an estimate of one or more routes prior to performing the actual route calculation. Providing this estimate or estimates in advance to users can help users make informed decisions on how to allocate fleet resources, including drivers, vehicles, and/or other equipment.

Counterintuitively, the routing module can perform distance estimation using an algorithm that does not calculate a valid route that can be traveled by a vehicle. Instead, the routing module can compute a spanning tree or minimum spanning tree representation of a route, where nodes in the tree represent vehicle stops and edges represent cost between the stops (such as driving time, fuel costs, distance, wait time, combinations of the same, or the like). A user can request multiple distance estimates to be run with different routes.

For example, the vehicle management system 150 can output a user interface that enables a user to select stops to be included in a preliminary route. In response to this user selection or in response to a user's explicit request for distance estimation information (via, for example, a user interface control selection), the routing module can perform distance estimation by computing a spanning tree.

While the spanning tree solution may be an underestimate of the actual routing time, comparison of different spanning tree solutions can reflect differences in actual routing times. Thus, although the spanning tree solutions may not be accurate, they can give a user a ballpark or rough sense of the cost(s) of a route. Further, the spanning tree solution can be calculated much faster, for example, in a manner of seconds, than the routing algorithm, which may take many minutes or even hours to compute.

In alternative embodiments, heuristic algorithms other than spanning tree algorithms can be used. Some examples include the Hungarian algorithm and nearest neighbor algorithms. Spanning tree models are well known in the art and thus are not described herein in greater detail.

Figure 7:
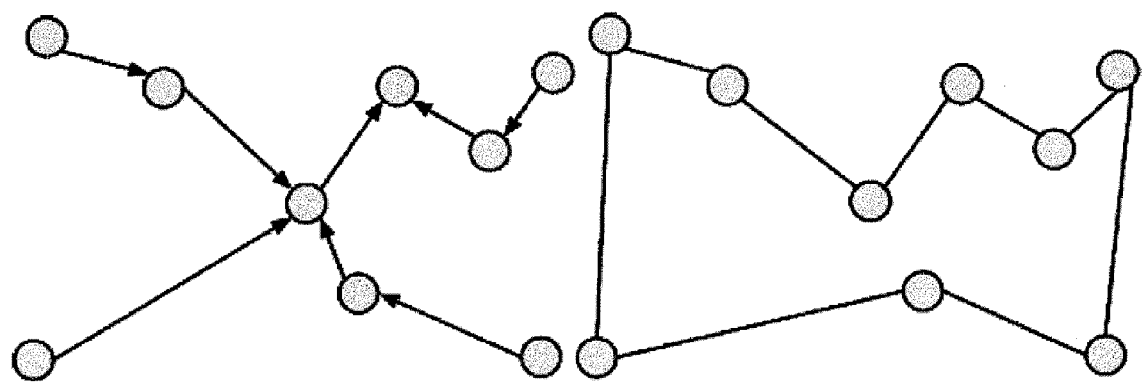
FIG. 7 illustrates a schematic diagram of the results of two different types of algorithms applied to a predetermined set of stops on a map.

FIG. 7 illustrates the results of two different algorithms applied to the same set of stops. On each side of FIG. 7, the stops are illustrated as a circle.

On the left-hand side of FIG. 7, a spanning tree model is algorithm has been applied to the stops so as to provide at least one connection between all of the stops. This result does not provide a usable route for vehicle to follow in order to reach all the stops in an efficient manner, for the purposes of delivering items, for example. However, it has been found that the summation of the distance of each leg of the spanning tree model results provide a total distance that is roughly accurate to the total distance resulting from an optimized route connecting all the stops, which is illustrated on the right-hand side of FIG. 7.

Further, less computationally demanding algorithms, such as a spanning tree model, can be executed and reexecuted with far less computing power than that required for an optimizing routing algorithm, such as a traveling salesman type of solution illustrated on the right-hand side of FIG. 7. The results of the spanning tree models can thus be used incrementally, for example, by adding or removing stops in rerunning the model to provide additional estimations and alternative routes for purposes such as workload balancing between drivers. As noted above, models such as a spanning tree model do not provide, normally, usable routes. Thus, it can be considered counterintuitive to use such a model in a vehicle routing system.

VIII. Exclusion Zones Embodiments

The routing module 200 can also perform a method of creating an exclusion zone that is to be routed around for certain vehicles. In many areas of the world, exclusion zones are in force, such as for example an exclusion that vehicles with certain license plate numbers are allowed in a certain part of a city only at specified times. Existing approaches to routing vehicles that would ordinarily go through an exclusion zone force the vehicles to go around the exclusion zone. In some embodiments, the routing module can instead perform more intelligent planning with respect to the exclusion zone. For instance, the routing module can delay the start of a vehicle's route if it would be more efficient to do so.

As an illustration, an exclusion zone might specify that certain vehicles cannot enter the zone from 9 am to 10 am. If a driver of such a vehicle is ordinarily scheduled to start his route at 8 am but has to go through the exclusion zone, the routing module can change the driver's start time to 9 am or some other time so as to allow the driver to go through the exclusion zone. More generally, the routing module can calculate whether it is faster to go around the exclusion zone or go through after a delay, and pick the faster of the two.

To aid with the above calculation of which option is faster (go around or wait and go through), the routing module may employ a heuristic. This heuristic can involve calculating a straight line distance from the driver's initial position (such as home) to the first stop (e.g., a customer location). The straight line distance can be calculated using any currently-available technique. Then, the actual road distance from the driver's initial position and the first stop can be calculated using the road network. This distance is typically greater than the straight line distance.

A ratio of the actual road distance to the straight line distance can be calculated. In addition, the routing module can calculate the straight line distance from the driver's initial position to the closest point on the exclusion zone. The routing module can then estimate the actual road distance to the exclusion zone by multiplying the straight line distance from the driver's initial position to the exclusion zone by the calculated ratio. Thus, for example, if the ratio is calculated to be 2.4 (the actual road distance is 2.4 times the straight line distance from the starting point to the first stop), and the straight line distance from the starting point to the exclusion zone is 10 minutes, the estimated actual road distance to the exclusion zone is 2.4*10=24 minutes. This heuristic can save processing time, among other benefits.

IX. Terminology

As used herein, the term "street," in addition to having its ordinary meaning, can include, among other things, a road, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for generating a user interface for a manager of vehicles in a vehicle fleet and controlling routing of the vehicles between stop locations in a geographic region, the user interface providing functionality for the manager to interactively assign and move locations of individual points on a graphical road map, the individual points defining territories around the individual points that are serviceable by the vehicles, the territories being depicted on the graphical road map as shadows that are darker closer to the individual points and paler farther from the individual points according to increasing driving time from the individual points, the system comprising:

a vehicle management system comprising computer hardware, the vehicle management system configured to:
receive, from a user device, selection of an optional mode of operation corresponding to a technique for generating territories associated with respective vehicles in a vehicle fleet;
electronically generate a user interface for presentation by the user device to a user of the user device, the user interface comprising functionality, when operating in the optional mode of operation, to depict a plurality of predetermined stop locations for at least first and second vehicles of the vehicle fleet on a graphical road map, for the user to specify a first user identification of locations of first and second points on the graphical road map, and for the user to specify a second user indication to move the location of the first point to a different location;
receive, from the user device, the first user identification of the locations of the first and second points;
determine a first plurality of concentric areas on the graphical road map corresponding to increasing driving time from the location of the first point and a second plurality of concentric areas on the graphical road map corresponding to increasing driving time from the location of the second point;

wherein the user interface further comprises functionality to:
depict a first territory of the territories surrounding the location of the first point as a first shadow of a first color on the graphical road map and a second territory of the territories surrounding the location of the second point as a second shadow of a second color different from the first color on the graphical road map, the first shadow being darker in at least one of the first plurality of concentric areas closer to the location of the first point and paler in at least one of the first plurality of concentric areas farther away from the location of the first point, the second shadow being darker in at least one of the second plurality of concentric areas closer to the location of the second point and paler in at least one of the second plurality of concentric areas farther away from the location of the second point, and depict the locations of the plurality of predetermined stop locations classified as within the first territory in the first color and the locations of the plurality of predetermined stop locations classified as within the second territory in the second color on the graphical road map, wherein in response to receiving the second user indication to move the first point to the different location, the vehicle management system is configured to:

determine a third plurality of concentric areas on the graphical road map corresponding to increasing driving time from the different location, and cause the user interface to depict the first territory as surrounding the different location as a third shadow of the first color on the graphical road map, the third shadow being darker in at least one of the third plurality of concentric areas closer to the different location and paler in at least one of the third plurality of concentric areas farther away from the different location.

2. The system of claim 1, wherein the user interface further comprises functionality for the user to specify a third user indication to assign the first territory to the first vehicle, and the vehicle management system is further configured to assign the first territory to the first vehicle based at least on the third user indication to assign the first territory to the first vehicle.

3. The system of claim 1, wherein the user interface further comprises functionality to depict at least some of the plurality of predetermined stop locations between the locations of the first and second points on the graphical road map in a third color different from the first and second colors, the third color being a color resulting from blending of the first and second colors.

4. The system of claim 1, wherein the vehicle management system is further configured to:

assign a cost to each of the plurality of predetermined stop locations based at least on a proximity of each of the plurality of predetermined stop locations to the locations of the first point; and classify the at least some of the plurality of predetermined stop locations as within one of the first and second territories further based at least on the assigned costs of the at least some of the plurality of predetermined stop locations.

5. The system of claim 4, wherein the vehicle management system is further configured to classify at least some of the plurality of predetermined stop locations as within one of the first and second territories so that a total of the assigned costs of the locations of the plurality of predetermined stop locations classified as within the first territory are about the same as a total of the assigned costs of the locations of the plurality of predetermined stop locations classified as within the second territory.

6. The system of claim 4, wherein the vehicle management system is configured to generate the first and second routes further based at least on the assigned costs of the locations of the plurality of predetermined stop locations classified as within the first and second territories.

7. The system of claim 4, wherein the vehicle management system is further configured to assign the cost to each of the plurality of predetermined stop locations according to a non-linear function depending at least on the proximity of each of the plurality of predetermined stop locations to the location of the first point.

8. The system of claim 7, wherein the non-linear function further depends at least on vehicle drive times from each of the plurality of predetermined stop locations to the location of the first point.

9. The system of claim 8, wherein the vehicle management system is configured to generate the first and second routes further based at least on the assigned costs of the locations of the plurality of predetermined stop locations classified as within the first and second territories.

10. A system for providing a user interface for a manager of vehicles in a vehicle fleet and assisting in routing of the vehicles between stop locations in a geographic region, the user interface providing functionality for the manager to interactively assign and move locations of individual points on a graphical road map, the individual points defining territories around the individual points that are serviceable by the vehicles, the territories being depicted on the graphical road map as shadows that are darker closer to the individual points and paler farther from the individual points, the system comprising:

a user device comprising computer hardware configured to:

display a user interface received from a vehicle management system, the user interface comprising functionality for:

depicting on a graphical road map, a plurality of predetermined stop locations for at least first and second vehicles of a vehicle fleet, a user to specify a first user identification of a location of a first point on the graphical road map as a center of a first territory and specify a location of a second point on the graphical road map as a center of a second territory, the first territory being associated with the first vehicle and the second territory being associated with the second vehicle, depicting the first territory associated with the first point as a first plurality of concentric shadows of a first color on the graphical road map and the second territory associated with the second point as a second plurality of concentric shadows of a second color different from the first color on the graphical road map, at least one of the first plurality of concentric shadows being darker near the location of the first point and at least another of the first plurality of concentric shadows which is farther away from the location of the first point being paler than the at least one of the first plurality of concentric shadows, at least one of the second plurality of concentric shadows being darker near the location of the second point and at least another of the second plurality of concentric shadows which is farther away from the location of the second point being paler than the at least one of the second plurality of concentric shadows, depicting a first subset of the plurality of predetermined stop locations on the graphical road map which are proximate to the location of the first point according to increasing drive time from the location of the first point in the first color and a second subset of the plurality of predetermined stop locations on the graphical road map which are proximate to the location of the second point according to increasing drive time from the location of the second point in the second color, depicting a first route on the graphical road map, the first route including the first subset of the plurality of predetermined stop locations depicted in the first color, depicting a second route on the graphical road map, the second route including the second subset of plurality of predetermined stop locations depicted in the second color, the user to specify a second user indication to move the first point to a different location, and after receiving the second user indication to move the first point to the different location, depicting the different location of the first point on the graphical road map as the center of the first territory and the first territory as a third plurality of concentric shadows of the first color on the graphical road map, at least one of the third plurality of concentric shadows being darker near the different location and at least another of the third plurality of concentric shadows which is farther away from the different location being paler than the at least one of the third plurality of concentric shadows; and transmit, to the vehicle management system, the first user identification of the first and second points and the second user indication to move the first point to the different location.

11. The system of claim 10, wherein the user interface further comprises functionality for the user to specify a third user indication to assign the first territory to the first vehicle, and the user device is further configured to transmit, to the vehicle management system, the third user indication to assign the first territory to the first vehicle.

12. The system of claim 10, wherein a greater paleness of the first plurality of concentric shadows indicates greater driving time from the location of the first point, and a greater paleness of the second plurality of concentric shadows indicates greater driving time from the location of the second point.

13. The system of claim 10, wherein the user interface further comprises functionality to:
   depict a third subset of the plurality of predetermined stop locations on the graphical road map which are proximate to the different location of the first point according to increasing drive time from the different location of the first point in the first color, and
   depict a third route on the graphical road map, the third route including the third subset of the plurality of predetermined stop locations depicted in the first color.

14. The system of claim 10, wherein the user interface further comprises functionality for depicting at least some of the locations of the plurality of predetermined stop locations between the first and second points on the graphical road map in a third color different from the first and second colors.

15. The system of claim 14, wherein the third color is a color resulting from blending the first and second colors.

\* \* \* \* \*